United States Patent
Hsu et al.

(10) Patent No.: US 11,820,845 B2
(45) Date of Patent: Nov. 21, 2023

(54) POLYAMINE ADDITIVE

(71) Applicant: Lubrizol Advanced Materials, Inc., Cleveland, OH (US)

(72) Inventors: Shui-Jen R. Hsu, Foothill Ranch, CA (US); Dominic Cremona, Cleveland, OH (US); Darlene D. Rota, Avon, OH (US); Adlai J. Perry, North Olmsted, OH (US); Keith Rawlins, Hiram, OH (US); Stephan A. Horvath, North Royalton, OH (US)

(73) Assignee: LUBRIZOL ADVANCED MATERIALS, INC, Cleveland, OH (US)

( * ) Notice: Subject to any disclaimer, the term of this patent is extended or adjusted under 35 U.S.C. 154(b) by 252 days.

(21) Appl. No.: 17/279,347

(22) PCT Filed: Sep. 25, 2019

(86) PCT No.: PCT/US2019/052814
§ 371 (c)(1),
(2) Date: Mar. 24, 2021

(87) PCT Pub. No.: WO2020/068889
PCT Pub. Date: Apr. 2, 2020

(65) Prior Publication Data
US 2021/0395417 A1 Dec. 23, 2021

Related U.S. Application Data

(60) Provisional application No. 62/736,696, filed on Sep. 26, 2018.

(51) Int. Cl.
| | | |
|---|---|---|
| *C08F 220/06* | (2006.01) | |
| *C08F 220/60* | (2006.01) | |
| *C09D 7/65* | (2018.01) | |
| *C09D 7/61* | (2018.01) | |
| *C08F 220/28* | (2006.01) | |
| *C08L 33/08* | (2006.01) | |
| *C09D 5/02* | (2006.01) | |

(52) U.S. Cl.
CPC ........ *C08F 220/60* (2013.01); *C08F 220/286* (2020.02); *C08L 33/08* (2013.01); *C09D 5/024* (2013.01); *C09D 7/61* (2018.01); *C09D 7/65* (2018.01)

(58) Field of Classification Search
CPC .. C08F 220/60; C08F 200/286; C08F 200/34; C08F 220/28; C08F 220/06; C08F 220/14; C08F 220/285; C08F 226/10; C09D 5/024; C09D 7/61; C09D 7/65; C09D 7/62; C09D 133/08; C08L 33/08; C08L 33/24; C08L 33/14; C04B 41/009; C04B 41/63; C04B 41/48; C04B 41/4834; C08K 3/22
USPC ........................................................ 524/501
See application file for complete search history.

(56) References Cited

U.S. PATENT DOCUMENTS

| | | | |
|---|---|---|---|
| 4,939,200 A | 7/1990 | Stack et al. | |
| 5,824,734 A | 10/1998 | Yang | |
| 5,849,833 A | 12/1998 | Puschak et al. | |
| RE36,042 E | 1/1999 | Landy et al. | |
| 5,861,188 A | 1/1999 | Schall et al. | |
| 7,521,101 B2 | 4/2009 | Naisby et al. | |
| 9,303,183 B1 | 4/2016 | Greer | |
| 10,717,894 B2 | 7/2020 | Iyer et al. | |
| 11,317,627 B2 | 5/2022 | Hayashi et al. | |
| 2008/0014154 A1 | 1/2008 | Mougin et al. | |
| 2009/0191419 A1* | 7/2009 | Yukawa | C09D 5/024 |
| | | | 428/522 |
| 2022/0033638 A1* | 2/2022 | Hsu | C08L 33/26 |

FOREIGN PATENT DOCUMENTS

| | | |
|---|---|---|
| EP | 2692753 | 2/2014 |
| EP | 3811663 | 4/2021 |
| WO | 2017/054156 | 4/2017 |
| WO | 2017/132380 | 8/2017 |
| WO | 2017/191131 | 11/2017 |
| WO | 2019/005543 | 1/2019 |

OTHER PUBLICATIONS

PCT International Search Report, dated Dec. 6, 2019.
Written Opinion of the International Searching Authority, dated Dec. 6, 2019.

* cited by examiner

*Primary Examiner* — Hannah J Pak
(74) *Attorney, Agent, or Firm* — Samuel B. Laferty; Vincent Anthony Cortese; Michael Miller

(57) ABSTRACT

Polyamine additives are disclosed that are useful to provide early water resistant to drying anionically colloidally stabilized polymer dispersions in aqueous media. The polyamines are polymerization products from ethylenically unsaturated monomers with pendant tertiary amine groups with ethylenically unsaturated monomers with pendant poly (alkylene oxide) chains of 88 to 1200 g/mole molecular weight.

8 Claims, No Drawings

POLYAMINE ADDITIVE

This application claims priority from PCT Application Serial No. PCT/US2019/052814, filed on 25 Sep. 2019, which claims the benefit of U.S. Provisional Application No. 62/736,696, filed on 26 Sep. 2018.

FIELD OF INVENTION

The present invention relates to improved water dilutable polyamine additives for waterborne coating compositions. Polyamine additives are known in the road marking industry for their ability speed the initial film formation and drying process. This disclosure is a polyamine additive which can be used in the coatings formulations/application while achieving good shelf-life stability.

BACKGROUND OF THE INVENTION

Polyamine curatives are known in the road marking industry for their ability to help speed the conversion of a dispersion of binder, pigments, etc. in a continuous media to an aggregated material, continuous film or dry film.

U.S. Pat. No. 5,527,853 (equivalent to EP0409459) discloses a shelf stable fast-cure aqueous coating composition using a polyfunctional amine and a volatile base.

U.S. Pat. No. 5,705,560 discloses an aqueous coating composition using a latex having anionic property, a water-soluble polymer formed from a monomer mixture containing at least 20 wt. % of amine functional groups containing monomer and a volatile base to raise the pH.

U.S. Pat. No. 7,892,131 discloses a fast drying aqueous composition suitable for use in making roadway markings from a composition comprising an anionically stabilized binder having phosphorus acid functional polymer component, a polyfunctional amine component and a volatile base.

US2015/0259559 to BASF discloses compositions containing anionically stabilized copolymer dispersions, a volatile base, and a derivatized polyamine that functions to decrease the setting time of the anionically stabilized copolymer dispersions.

SUMMARY OF THE INVENTION

Polyfunctional amines of various types have been used with anionically stabilized polymer dispersions and emulsions as curatives for fast dry roadway marking. Improvements in the polyamine additive are possible for other coatings by incorporating repeating units into the polyamine of side-chain poly(alkylene oxide) of specific molecular weight. The repeating units with side-chain poly(alkylene oxide) provide better in-can stability of the coating (minimizing undesirable interactions between the polyamine additive and the polymer binder particles during storage), and provide better moisture permeability and evaporation rates after the initial aggregation of the dispersed polymer in the drying step than does prior art polyamine additives.

Polyamine additives function with anionically stabilized polymer dispersions and emulsions by being available to interact with anionic groups, such as carboxylic acid, and aggregate multiple polymer particles into aggregates that speed the colloidal destabilization of the polymer particle dispersion forming a water resistant film surface (with dispersion including emulsions). The interaction of the amine groups of the polyamine is hastened by a pH change (often associated with evaporation of base by volatilization of a volatile amine during drying). Different amine groups (e.g., primary, secondary, tertiary, and quaternized amine groups) interact with anionic groups at different reaction rates and form bonds/associations (amide, salt, etc.) of different durability.

The polyalkylene oxide side-chains of the currently disclose polyamine additive slow down the interaction of the nitrogen of the polyamine with the surface anionic groups of the polymer particles until the appropriate time in the film formation process. This may be due to steric factors where the polyalkylene oxide physically separates the amine from the anionic groups on the particles. As any volatile base present in the coating composition becomes more deficient at the film interface during drying of the film, the polyamine additive becomes more active at the surface of a film than the layers below the surface because of the faster pH change from pH basic towards pH neutral or slightly acidic occurs fastest at the film surface with surrounding air.

After the polyamine additive forms aggregates, because the bonds between the polyamine additive and anionic groups on the polymer particles are ionic interactions or covalent bonds, the addition of water in the form of rain does not cause the particles to de-aggregate and the aggregated polymer particles repel the water from the surface and protect the coating composition (or film) below them from becoming diluted or washed off with the rain or water. At the same time the side-chain poly(alkylene oxide) within the polyamine additive is porous to moisture vapor from the coating composition in a film and allows evaporation to proceed from a film at effective rates to allow the film to dry quickly. Absent the polyamine additive of this disclosure, the skin on a drying coating film has very little porosity and can slow the evaporation of water from deeper within the film to the surface.

DETAILED DESCRIPTION OF THE INVENTION

Various preferred features and embodiments will be described below by way of non-limiting illustration.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade. The use of (meth) in a monomer or repeat unit indicates an optional methyl group, such as methyl (meth)acrylate.

The use of (meth) in a chemical name in this document is meant to indicate that a methyl substituent is optionally present. Thus, the term "(meth)acrylate monomer" includes acrylate, methacrylate, diacrylate, and dimethacrylate monomers.

It is known that some of the materials described above may interact in the final formulation, so that the components of the final formulation may be different from those that are initially added. For instance, the polyamine species can interact to form aggregated material with the polymer dispersions. The polymer dispersions can aggregate, close pack with the volatilization of the continuous phase, and fuse into polymer masses such as films. The products formed thereby, including the products formed upon employing the composition of the present invention in its intended use, may not be susceptible of easy description. Nevertheless, all such modifications and interaction products are included within the scope of the present invention; the present invention encompasses the composition prepared by admixing the components described above.

In this disclosure, we will use the term polymer dispersion to describe dispersions of polymer having a number average particle size from about 50 nanometers to about 10 micrometers; more desirably 80 nanometers to 5 microns by light scattering, irrespective of whether the polymer dispersions were made by dispersing a pre-synthesized polymer in an aqueous media or forming a polymer dispersion by an emulsion polymerization process. These particle sizes are common for many different types of polymers and can be colloidally stable for long periods of time provided a good steric or electrostatic barrier is provided to each particle as Brownian motion is generally sufficient to keep polymer particles of these sizes randomly distributed in an aqueous media even though the polymer has lower density than the aqueous phase and might otherwise (if the particles were larger in diameter) cream to the top of the vessel or container. Some authors for their own reasons distinguish between polymer dispersions and polymer emulsions, but in this disclosure the word polymer dispersion will mean polymer dispersions made by dispersing polymer in aqueous media and polymer dispersions made by emulsion polymerization.

It is the intent of coating formulators that additives/curatives added to polymer dispersions and emulsions should remain inactive in the formulation (composition) until the time when the formulator desires the composition to form a film. It is the desire of the formulator that the additives/curative(s) not interact via chemical reactions with the dispersed polymer during storage of the composition prior to film formation. Desirably, colloidal stability of polymer dispersions and dispersions of fillers, pigments, and other dispersed components to the coating remain colloidally stable for months and potentially year (minimizing waste of coating formulations due to shelf life constraints or slow inventory turnover). However, curatives tend to interact with polymer dispersions during storage and during times of colloidal stability reduction and can cause aggregates of polymer particles during storage.

While not wishing to be bound by theory it is believed that the repeating units having side chain poly(alkylene oxide) of molecular weight from about 132 to about 1100 g/mole when incorporated into the polyamine additive in the amounts specified herein provide an environment for the amine groups of the polyamine additive of this disclosure within the continuous aqueous phase where the amine groups are partially sterically hindered from interacting with anionic colloidal stabilizing groups on the dispersed polymer phase while the composition is at high pH above 7, more desirably from 7.5 or 8.5 to 12.5 and preferably from 8.5 or 9 to 10.5 or 11. Longer storage times benefit from higher pH values. The pH value can be very near the lower limit if the polyamine additive is only added a few hours or days before use of the coating composition. Formulated paints tolerate the polyamine additive at lower pH values than non-formulated polymer dispersions. Poly(alkylene oxide) chains incorporated in the backbone of the polyamine generally don't provide the same environment as side chain or pendant poly(alkylene oxide) chains. Poly(alkylene oxide) chains lower in molecular weight than 132 or above 1100 g/mole do not provide the optimal environment for this steric effect on the interaction of the amine groups of the polyamine with anionic stabilizing groups on the polymer dispersion. It is also theorized that the poly(alkylene oxide) of molecular weight from 132 to 1100 inclusive of the end points can allow, when the pH is dropped, the interaction of the amine groups of the additive with the anionic groups on the particles surfaces and help form a water resistant coating surface when coating compositions formulated with the polyamine additive of this disclosure are applied as a film to a surface. This additive effect protects the film from the coating compositions from smudging and protects the coatings from water if the coatings would happen to get rained upon or see water spray from some other source.

So, the benefit of the polyamine additive of this disclosure is that it can have very long shelf stability at room temperature (arbitrarily 22-25° C.) or even at elevated temperatures of a warehouse such as 48.9° C. (120° F.) when formulated into an anionically or partially anionically and partially non-ionically stabilized colloidally stabilized polymer dispersion or coating composition including such a polymer dispersion. The polyamine additive of this disclosure can also cause a polymer dispersions and/or coating composition with such polymer dispersion to form a water resistant film surface within a shorter period of time than the identical polymer dispersion or coating composition without the polyamine additive (enhancing quick film formation and resistance to water and/or smudging of the film or coating). The polyamine additive in some formulations seems to act as a flash rust inhibitor (minimizing rust colored stains and/or formation of corrosion on metal surfaces) as the coating composition dries on a metal surface.

The polyamine additive of this disclosure is a polyamine additive derived from polymerizing at least 2 different monomers and optionally including repeating units from other co-polymerizable monomers. The first monomer can be a free radically polymerizable tertiary amine monomer of the formula $A_1$ or $A_2$ or a blend thereof. The tertiary amine monomer is desirably present as repeating units in the amount from about 30 to about 90 wt. %, more desirably from about 55 to about 85 wt. % of the polyamine additive, preferably from about 60 to about 80 wt. % and more preferably from about 65 to 75 wt. % of the polyamine additive.

The $A_1$ monomer is according to the formula:

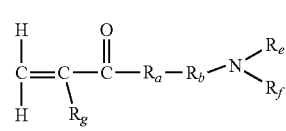

and the $A_2$ monomer is according to the formula:

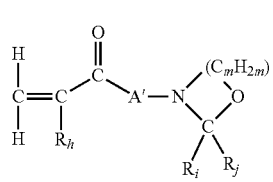

wherein $R_a$ is O or $NR_k$, $R_b$ is a $C_1$ to $C_6$ alkylene, $R_e$ is a $C_1$-$C_4$ alkyl, $R_f$ is a $C_1$-$C_4$ alkyl, $R_g$ is H or methyl or ethyl, $R_h$ is H or a $CH_3$, and $R_k$ is H, a $C_1$-$C_4$ alkyl, or a $C_1$-$C_4$ acyl group, A' is poly(oxy-$C_2H_4$ and/or oxy$C_3H_6$) homopolymer or copolymer of number average molecular weight of 88-348 g/mole, m is 2 or 3, Ri is selected from a group comprising hydrogen, phenyl group, benzyl group, and a $C_1$-$C_{12}$ alkyl group if it is not liked directly to Rj to form a cyclic ring with the C atom connected to $R_i$ and $R_j$, Rj is selected from a group comprising hydrogen, a $C_1$-$C_4$ alkyl group, if it is not linked directly to Ri, and optionally Ri and Rj can be link together with a chemical covalent bond to form a $C_4$ or $C_5$ alkylene group forming a 5 or 6 membered ring with the C atom to which they are bonded in the structure $A_2$ above. The $A_1$ monomer is available from a variety of suppliers as dialkylaminoalkylacrylamide or dialkylaminoalkyl acrylate.

An interesting feature of the $A_2$ monomer and the repeating unit from the $A_2$ monomer is that it can react with water and the tertiary amine group can become a secondary amine and the monomer or repeating unit is hydroxyl terminated and a ketone group (leaving group) is formed. While it is the intent of the authors of this disclosure to use $A_2$ in the form as specified, it is noted that some portion (such as 5, 10, 20, 30 or 50 wt. % of the $A_2$ monomer may be in the form shown below or the obvious repeating unit derived from polymerizing this monomer.

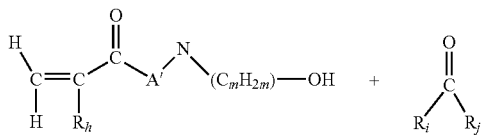

The other required monomer (B) is a poly(alkylene oxide) monomer or repeating unit from this monomer. These are commercially available under the Bisomer trademark from GEO Specialty Chemicals, Inc. or can be made by esterifying an acrylic or (alk)acrylic acid with a poly(alkylene oxide)

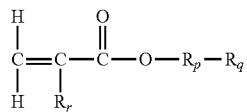

wherein $R_p$ is a polyalkylene oxide of number average molecular weight from about 88 to about 1200 g/mole, more desirable from about 132-1100; with 2 or 3 or 4 carbons per alkylene group (more desirably at least 90 wt. % of the alkylene oxide groups are ethylene oxide), $R_q$ is H or $C_1$-$C_8$ alkylene group and more desirably H, methyl or ethyl; and $R_r$ is H or methyl or ethyl.

The repeating units from polymerizing the B monomer (side chain poly(alkylene oxide) monomer) is desirably present from about 10 to about 60 wt. % of the polyamine additive of this disclosure, more desirably from about 15 to about 45 wt. %; preferably from about 20 to about 40 wt. % and more preferably from about 25 to about 35 wt. % of the polyamine additive.

An optional third, fourth, etc. repeating unit or monomer(s) defined as (C) could be present in the polyamine additive, provided the specified amount of tertiary amine repeating units and poly(alkylene oxide) monomer are present as recited above. The optional third or more monomer is desirably present from about 0 to about 60 wt. % of the repeating units of said polyamine additive, more desirably from about 0 to about 30 wt. % of other repeating units from free radically polymerizable monomers, preferably from about 0 to about 10 or 20 wt. % of said repeating units and more preferably from about 0 to about 5 wt. % of the repeating units in the polyamine additive other than monomer $A_1$ and/or $A_2$ and monomer B, free radical initiator fragments, and chain transfer molecule fragments.

In one embodiment of the general disclosure, it is desirable that a C repeating unit or monomer forming the C repeating unit, if it is n-vinyl pyrrolidone or the repeating unit from n-vinyl pyrrolidone is not present at 10 wt. % or above in the polyamine additive of this disclosure.

Suitable polyamine additives can possess a variety of molecular weights and degrees of nitrogen-derivatization. For example, the polyamine additive can have an average molecular weight of between 500 and 5,000,000 and preferably between 1,000 or 10,000 and 500,000 Daltons. In some embodiments, the molecular weight is from 50,000 to 500,000 Dalton. In some embodiments, the polyamine additive is present in the coating composition at between 0.1% by weight and 5% by weight, based on the dry weight of the anionically colloidally stabilized copolymer.

Various additional monomers can optionally be copolymerized with the prepolymer. For instance, the acrylic polymer or copolymer can be derived from a variety of unsaturated monomers such as from acrylate, alkyl (alk) acrylate, vinyl chloride, vinylidene chloride, vinyl acetate, styrene, and dienes such as butadiene. The various alkyl acrylates (or esters of acrylic acid) are of the formula:

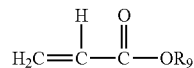

wherein $R_9$ is an alkyl group containing 1 to about 15 carbon atoms, an alkoxyalkyl group containing a total of 1 to about 8, 9 or 10 carbon atoms, a cyanoalkyl group containing 1 to about 10 carbon atoms, or a hydroxy alkyl group containing from 1 to about 18 carbon atoms. The alkyl structure can contain primary, secondary, or tertiary carbon configurations and normally contains 1 to about 10 carbon atoms with 2 to 8 carbon atoms being preferred. Examples of such acrylic esters include methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like. Preferred examples include ethylacrylate, butyl acrylate, 2-ethyl hexyl acrylate, and the like.

The various alkyl alkacrylates (or esters of alkacrylic acid) are of the formula:

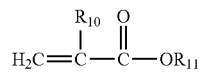

wherein $R_{10}$ is H or a $C_{1-2}$ alkyl, and $R_{11}$ is an alkyl group containing 1 to about 15 carbon atoms, an alkoxyalkyl group containing a total of 1 to about 10 carbon atoms, a cyanoalkyl group containing 1 to about 10 carbon atoms, or a hydroxy alkyl group containing from 1 to about 18 carbon atoms (as described above). Examples of various alkyl (alk)acrylates include methyl methacrylate, ethyl methacrylate, methoxymethyl acrylate, methoxyethyl acrylate, ethoxyethyl acrylate, butoxy ethyl acrylate, ethoxypropyl acrylate, and the like. Derivatives include hydroxyethyl acrylate, hydroxypropyl acrylate, hydroxybutyl acrylate, and the like. Mixtures of 2 or more of the above monomers can also be utilized.

Unsaturated carboxylic acid containing monomers are not intentionally used in the polyamine additive. These monomers not intentionally included are acrylic acid, methacrylic acid, itaconic acid, maleic acid, fumaric acid, 2-carboxyethyl acrylate and the like. Half esters of the above di-carboxylic acids are not intentionally added to the polyamine additive to be used as monomers wherein the ester portion is desirably an alkyl having from 1 to about 10 carbon atoms and specific examples include mono methyl maleate, mono methyl fumerate, mono methyl itaconate, and the like.

Other co-polymerizable (ethylenically unsaturated) monomers may be utilized to make copolymers including styrenic monomers (as a co-monomer in polyamine additive), vinyl chloride type monomers, acrylonitrile type monomers, various vinyl ester monomers, various acrylamides monomers, various alkynol acrylamides and the like. Considering the styrenic monomers (as both a primary monomer in styrene-butadiene polymers or a co-monomer in acrylate polymers), they are often referred to as vinyl substituted aromatic compounds (styrenic monomers) and include styrene, alkyl substituted styrene 1-vinylnaphthalene, 2-vinylnaphthalene, and the alkyl, cycloalkyl, aryl, alkaryl and aralkyl derivatives thereof, in which the total number of carbon atoms, in the combined, substituents is generally from 8 to about 12. Examples of such compounds include 3-methyl styrene vinyltoluene; alpha-methylstyrene; 4-n-propyl styrene, 4-t-butyl styrene, 4-methoxy-styrene; 4-dimethylaminostyrene; 3,5-diphenoxystyrene; 4-p-tolyl styrene; 4-phenyl styrene; 4,5-dimethyl-1-vinylnaphthalene; 3-n-propyl-2-vinyl-naphthalene, and the like. Styrene is typically preferred.

The vinyl chloride type monomers include vinyl chloride, vinylidene chloride, and the like.

The vinyl esters can generally be represented by the formula:

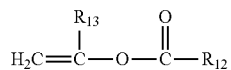

wherein $R_{13}$ is H or a $C_{1-2}$ alkyl, and $R_{12}$ is an alkyl group generally having from 1 to about 10 or 12 carbon atoms with from about 1 to about 6 carbon atoms being preferred. Accordingly, suitable vinyl esters include vinyl formate, vinyl acetate, vinyl propionate, vinyl butyrate, vinyl valerate, and the like. Vinyl esters with larger $R_{12}$ groups include the vinyl versatate monomers, such as Veo VA-P, Veo Va-10, and Veo Va-11.

The various vinyl ethers can be represented by the formula:

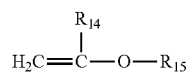

wherein $R_{14}$ is H or a $C_{1-2}$ alkyl, $R_{15}$ is desirably an alkyl having from 1 to about 10 carbon atoms. Specific examples include methyl vinyl ether, ethyl vinyl ether, butyl vinyl ether, and the like with methyl vinyl ether being preferred.

The acrylonitrile type monomers that can be utilized include acrylonitrile, or methacrylonitrile, or ethacrylonitrile, and the like.

The acrylamide monomers which can be polymerized to form a copolymer generally have the following formula:

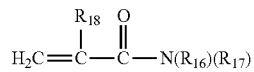

wherein $R_{18}$ is H or a $C_{1-2}$ alkyl, and each $R_{16}$ and $R_{17}$ individually represents a hydrogen atom or an alkyl group (straight chained or branched) containing from 1 to about 18 carbon atoms. Specific examples include acrylamide, ethyl acrylamide, butyl acrylamide, tert-octyl acrylamide, tert-butyl methacrylamide, and the like.

Functionalized acrylamides can also be utilized. Examples of such acrylamides include AMPS, i.e., 2-acrylamido-2-methylpropanesulfonic acid, DMAPMA, i.e., dimethylaminopropyl methacrylamide, and the like.

Carbonyl containing unsaturated comonomers may be copolymerized with the above monomers to make acrylic or vinyl polymers. Examples of carbonyl-containing monomers, which may be mentioned, include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propanols. Further examples include acrylamidopivalaldehyde, methacrylamidopivalaldehyde, 3-acrylamidomethylanisaldehyde, diacetone acrylate, acetonyl acrylate, diacetone methacrylate, acetoacetoxyethylmethacrylate, 2-hydroxypropylacrylate acetylacetate, and butanediolacrylate acetylacetate.

For enablement of the invention, the normal drying mechanism for aqueous based coating compositions is that the continuous phase is evaporated from the surface(s) of the film or coating until the disperse phase of the film and/or coating (the polymer binder and the particulate phase if any) comes in close proximity to each other and begins to form a continuous aggregate across the surface of the film or coating. This large continuous aggregate only forms when enough continuous phase has evaporated to cause the dispersed phase to come into very close contact with each other and compress the steric and/or ionic barrier between the various particles of the dispersed phase. Then, the colloidal stabilization layer on the particles of the dispersed phase begins to interpenetrate the colloidal stabilization later of the adjacent phase and the barrier effect of the barrier layer on each dispersed phase loses its barrier effect and promotes aggregation of the particles. The particles, to the extent they are capable at the film formation temperature deform to close pack as efficiently as possible. The steric and/or ionic barrier remains intact to some extent due to incompatibility between the barrier layer and the contents of each particle. In some areas of the film, the barrier layer gets pushed out of the interfaces and the particles of the dispersed phase come in direct contact with other particles in the dispersed phase. This is the agglomeration phase of film formation where addition contraction is achieved by merging particles together and pushing surface active molecules to the interfaces with other surfaces (such as the top of the film, the interface between the films and the substrate, etc.). To some extent, the molecular weight and viscosity of the barrier layers prevent complete migration of the barrier layers to interfaces and some portion of the barrier layers from the particles are trapped in the film in various forms.

Having explained film formation in the above paragraph in the absence of a polyamine additive, we will now explain film formation of an anionically (partially or fully) stabilized polymer dispersion in the presence of an active polyamine additive of this disclosure. Typically, the composition will have been pH adjusted to above 7 with a volatile base. As evaporation takes place, the volatile base will be evaporated from the surface of the film and the reactivity of the amine groups towards interaction of the polyamine additive with the anionic groups (such as carboxyl) of the anionic stabilization for the particles will be more favored as the pH drops to nearer 7. The polyamine additive is highly water swollen or dissolved in the water and bridges between particles in the dispersed phase. The pH drops faster at the interface between the film or coating and the air (interface of the film) because the volatile base is more volatile than the water of the aqueous phase. The particles of the surface of the film become aggregated at a lower solids content than an equivalent composition without the polyamine additive because the aqueous phase contained in the swollen or dissolved or dissolved polyamine additive is not available to separate the particles from each other and maintain the barrier between the particles. The interaction of the polyamine additive with the anionic groups on the surface of the dispersed phase promotes aggregation more than the collision of equivalent dispersed phase particles in the absence of the polyamine additive. Basically, a continuous aggregate of particles at the surface of the film (skin) forms as soon as the polyamine additive can start to connect particles at the pH at the surface. The high poly(alkylene oxide) content of the polyamine additive continuous to absorb water from below the surface of the skin and transport it to the surface (skin) of the film where the aqueous molecules can evaporate.

So, the polyamine additive promotes a skinning process of the film or coating composition earlier in the evaporation of the continuous phase when the polyamine additive is present. This skinning creates a barrier to water (from things like rain) from entering the film and redispersing the particles and binder. This means that the coating is resistant to redispersion of the particles of the dispersed phase earlier in the drying process (before evaporation has proceeded sufficiently to cause normal aggregation of the particles by conventional compression of the particles with each other during the drying process.

Drying of films can be a problem when the film is being generated at a temperature where evaporation of the aqueous phase is slow (low temperatures such as 15, 20 or 25° C.), when the moisture content of the air at the drying temperature is high and aqueous evaporation is slowed because the air is partially or fully saturated with water (such as in humid areas of the world or on humid days), and when the coating composition is applied very thick (such as ≥40 mils or ≥50 mils and a relatively large volume of water needs to evaporate (due to the depth of the film) through a limited amount of exposed surface area for the film or coating (relative to thinner films used on metals or wood coatings). This occurs a lot with roof coatings where it is desirable to put down a thick coat in a single application and avoid multiple applications and get a thicker barrier to water penetration, UV deterioration, and abrasive wear. Mils is an abbreviation in the English measurement scale of 0.001 inch. Each mil is equivalent to 0.0254 millimeters.

The polyamine additive being particular effective in combination with volatile bases such as ammonia hydroxide and low molecular weight water soluble amines having boiling points of less than 100° C. (so they evaporate before the water phase evaporates).

The coating compositions described herein with the polyamine additive also contain a volatile base. Volatile bases are basic substances that are soluble in water, remain in the aqueous coating composition under normal storage conditions, and evaporate from the aqueous coating composition under suitable drying conditions and faster than water at the drying temperature (so as to shift the pH from pH basic towards pH neutral or even pH acidic.

Generally, 1 or more volatile bases are incorporated in the composition in an effective amount to maintain the pH of the coating composition in the range of from 7.5 to 12.5 or in the range from 8 or 8.5 to 11. In some embodiments, 1 or more volatile bases are incorporated in the composition at between 0.1% by weight and 5.0% by weight based on the weight of the coating composition. In certain embodiments, 1 or more volatile bases are incorporated in the composition at between 0.5% by weight and 2.5% by weight.

Suitable volatile bases can be selected on the basis of several factors, including their basicity and volatility. Exemplary volatile bases include, but are not limited to, ammonia, lower alkylamines such as dimethylamine, triethylamine, and diethylamine, ethanolamine, diethanolamine, triethanolamine, morpholine, aminopropanol, 2-amino-2-methyl-1-propanol, 2-dimethylaminoethanol, and combinations thereof. In certain embodiments, the volatile base is ammonia. In some cases, ammonia is the sole volatile base present in the coating composition. Alternatively, ammonia can be incorporated in admixture with other volatile bases, non-volatile bases, such as alkali metal hydroxides, or combinations thereof.

The volatile base in combination with the polyamine additive of this disclosure is useful to facilitate curing and drying of coating based generally on any polymeric material that uses or can use at least some anionic (e.g., carboxylic) stabilization of the dispersed polymer phase. This includes a variety of acrylic binders (common to many paints) and urethane polymer dispersions (also common to many paints). The amount of anionic based surface active molecules (e.g., surfactant), surface active oligomers or polymers (e.g., support resins), or surface active repeat units incorporated into the polymer of the dispersion/coating is desirably from about 0.5 to about 5 wt. % based on the weight of the dispersed binder and dispersed particulate material in the coating.

The polyamine additive herein is useful in ink and coating compositions as component to form aggregated particles at the surface of a coating so the coating is more hydrophobic and resistance to redispersion or dilution of the polymer, pigment, and fillers by rainwater and other sources of water. The polymer dispersion of the coating desirably has at least some anionic functionality on the surface of the particles that can interact with the amine groups of the polyamine additive. Preferred anionic functionality is carboxylic acid groups. The polyamine additive provides coatings that are more quickly resistant to rain, more quickly resistant to smudging, and can be handled or packaged more quickly that equivalent coating formulations without the polyamine additive. This is because the polyamine additive facilitates formation of an aggregated polymer/particulate skin on the surface of a film or coating at an earlier time than this would occur in the absence of the polyamine additive. While some additives for polymers make a less porous film (e.g., due to crosslinking of the binder that sometimes can slow evaporation of water and polar solvents from within the drying film), the polyamine additive of this disclosure has side chain poly(alkylene oxide chains) that form hydrophilic areas in the surface of the drying film to promote moisture vapor release through the film and from the film surface, allowing final drying of the coating to proceed at normal speed or slightly faster than without the polyamine additive.

Having stated what, the polyamine additive does for a coating, it also does not significantly decrease the final barrier properties of the film or coating to any significant degree, relative to the same film or coating without the polyamine additive. Therefore, the polyamine additive (even though it is dispersible or soluble in water at most temperatures above 5° C.) does not make the final dry film or coating less resistance to water or most polar or water born staining materials (such as catsup, mustard, etc.). Coatings are often applied to materials to protect the substrate from water and polar staining materials, and thus the coatings containing the polyamine additive perform substantially equivalently in providing barrier properties to the same compositions less the polyamine additive. The polyamine additive just speeds the initial skin formation time (so the coatings are resistant to rain or water in a shorter period of time).

The polyamine additive is also useful for some biocidal activity (minimizing biological growth to some extent) in aqueous media. The polyamine additive can also function as a coagulant for some anionically charged dispersed phases in aqueous media.

When the polyamine additive is used in a coating composition, the coating compositions contain 1 or more anionically colloidally stabilized polymers. The amount of the polyamine additive is from about 0.1 to about 10 wt. % based on the weight of all the other components in the composition (such as the anionically stabilized (co)polymer dispersion, water, fillers, pigments, defoamers, etc.). More desirably, the amount of the polyamine additive is from about 0.2 or 0.5 to about 5, 6 or 8 wt. % of the composition. The amount of the anionically stabilized (co)polymer dispersion is about 10 to about 75 wt. % of the components in the coating; more desirably about 20 to about 65 wt. %. The other components (generally about 15 to 90, 25 to 79.5 or 80, or 30 to 75 wt. % of the composition) include fillers, pigments, defoamers, biocides, preservatives, etc. common in coating compositions. The anionically colloidally stabilized polymers can be derived from 1 or more ethylenically-unsaturated monomers, including (meth)acrylate monomers having from 3 to 23 carbon atoms and 2 to 6 oxygen atoms, vinyl aromatic monomers having from 8 to 14 carbon atoms, ethylenically unsaturated aliphatic monomers including dienes having from 2 to 12 carbon atoms, vinyl ester monomers having from 4 to 16 carbons atoms, and assorted other ethylenically unsaturated monomers and combinations thereof. In some embodiments, the anionically colloidally stabilized polymers can include pure acrylic copolymers, styrene acrylic copolymers, vinyl acrylic copolymers, or carboxylated or non-carboxylated styrene butadiene copolymers. In preferred embodiments, the anionically colloidally stabilized copolymer has a measured Tg of between −70° C. and 80° C.

In some embodiments, the anionically colloidally stabilized polymer includes an acrylic-based copolymer. Acrylic-based copolymers include copolymers derived from 1 or more (meth)acrylate monomers. The acrylic-based copolymer can be a pure acrylic polymer (i.e., a polymer or copolymer derived exclusively from (meth)acrylate monomers), a styrene-acrylic polymer (i.e., a copolymer derived from styrene and 1 or more (meth)acrylate monomers), or a vinyl-acrylic polymer (i.e., a copolymer derived from 1 or more vinyl ester monomers and 1 or more (meth)acrylate monomers).

The acrylic-based copolymer can be derived from 50% by weight or greater or 55% by weight or greater of 1 or more (meth)acrylate monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer) based on the total weight of monomers in said anionically colloidally stabilized polymer of said polymer dispersion. In some embodiments, the (meth)acrylate monomer can include esters of a, (3-monoethylenically unsaturated mono-carboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols).

The acrylic-based copolymer can be derived from greater than 0% or 0.2% by weight to 5% by weight of 1 or more carboxylic acid-containing monomers based on the total weight of monomers. Exemplary carboxylic-acid monomers include, but are not limited to, α,β-monoethylenically unsaturated mono- and dicarboxylic acids, such as acrylic acid, methacrylic acid, itaconic acid, crotonic acid, maleic acid, fumaric acid, dimethacrylic acid, ethylacrylic acid, allylacetic acid, vinylacetic acid, mesaconic acid, methylenemalonic acid, citraconic acid, and combinations thereof. In certain embodiments, the acrylic-based copolymer is derived from 0.2% by weight to 5% by weight, or 0.2% by weight to 2.5% by weight, acrylic acid, methacrylic acid, or combinations thereof.

The anionically colloidally stabilized polymer can have a glass-transition temperature (Tg), as measured by differential scanning calorimetry (DSC) using the mid-point temperature using as described, for example, in ASTM 3418/82, of between −70° C. and 80° C. In certain instances, the anionically colloidally stabilized copolymer has a measured Tg of greater than −70° C. (e.g., greater than −60° C., greater than −50° C., greater than −40° C., greater than −30° C., greater than −20° C., greater than −10° C., or greater than 0° C.). In some cases, the anionically colloidally stabilized copolymer has a measured Tg of less than 80° C., more desirably less than 70° C. and preferably 60° C. or less. In some cases, requiring elastomeric coatings, the anionically colloidally stabilized copolymer has a measured Tg of less than 15° C. (e.g., less than 10° C., less than 0° C., less than −10° C., less than −20° C., less than −30° C., less than −40° C., less than −50° C. In certain embodiments for elastomeric coatings, the anionically colloidally stabilized copolymer has a measured Tg of between −60° C. and 15° C., −55° C. and 10° C., or −50° C. and 0° C. In some embodiments requiring a hard coating, the anionically colloidally stabilized polymer can have a Tg of from 25° C. to 80° C. In these embodiments, the coating composition can further comprise a coalescing agent suitable to depress the Tg of the anionically colloidally stabilized polymer into the film forming range.

The anionically colloidally stabilized polymer can be prepared by heterophase polymerization techniques, including, for example, free-radical emulsion polymerization, suspension polymerization, and mini-emulsion polymerization. In some examples, the anionically colloidally stabilized polymer is prepared by polymerizing the monomers using free-radical emulsion polymerization. The emulsion polymerization temperature can range from 10° C. to 130° C. or from 50° C. to 90° C. The polymerization medium can include water alone or a mixture of water and water-miscible liquids, such as methanol, ethanol or tetrahydrofuran. In some embodiments, the polymerization medium is free of organic solvents and includes only water, which will mean preferably less than 2 wt. % organic components soluble in the water phase, more desirably less than 1 wt. %, and preferably less than 0.2 wt. % based on the weight of the aqueous phase.

The emulsion polymerization can be carried out as a batch process, as a semi-batch process, or in the form of a continuous process. In some embodiments, a portion of the monomers can be heated to the polymerization temperature and partially polymerized, and the remainder of the monomer batch can be subsequently fed to the polymerization zone continuously, in steps, or with superposition of a concentration gradient. In some embodiments, the copolymer is produced in a single stage (i.e., does not include separate feeds having different monomer compositions so as to produce a multistage polymer particle such as a core/shell particle).

The emulsion polymerization can be performed with a variety of auxiliaries, including water-soluble initiators and regulators. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Reduction-oxidation (redox) initiator systems are also suitable as initiators for the emulsion polymerization. The redox initiator systems are composed of at least 1, usually inorganic, reducing agent and 1 organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems can be used in the company of soluble metal compounds whose metallic component is able to exist in a plurality of valence states.

In the polymerization, it is possible to use molecular weight regulators or chain transfer agents, in amounts, for example, of 0 to 0.8 parts by weight, based on 100 parts by weight of the monomers to be polymerized, to reduce the molecular weight of the copolymer. Suitable examples include compounds having a thiol group such as tert-butyl mercaptan, thioglycolic acid ethylacrylic esters, mercaptoethanol, mercaptopropyltrimethoxysilane, and tert-dodecyl mercaptan. Additionally, it is possible to use regulators without a thiol group, such as terpinolene.

Dispersants, such as surfactants, can also be added during polymerization to help maintain the dispersion of the monomers in the aqueous medium. For example, the polymerization can include less than 3% by weight or less than 1% by weight of surfactants. In some embodiments, the polymerization is substantially free of surfactants and can include less than 0.05% or less than 0.01% by weight of 1 or more surfactants.

Anionic and nonionic surfactants can be used during polymerization. Suitable surfactants include ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids The coating compositions described herein further contain 1 or more polyamine curing additives. The polyamine curing additive functions to help the coating resist solubilization of the binder, pigments, fillers etc. if exposed to water or rain early in the drying/film forming process.

The coating compositions described herein with the polyamine curing additive also contain a volatile base. Volatile bases are basic substances that are soluble in water, remain in the aqueous coating composition under normal storage conditions, and evaporate from the aqueous coating composition under suitable drying conditions.

In some embodiments, the composition can further contain 1 or more additional polymers in the form of a solution or dispersion. These additional polymers can perform a variety of functions in the coating composition or in the final coating. But, the additional polymers are not a required component for the essential features of the disclosure.

The aqueous coating compositions can further include 1 or more additives, including pigments, fillers, dispersants, coalescents, pH modifying agents, plasticizers, defoamers, surfactants, thickeners, biocides, co-solvents, and combinations thereof. The choice of additives in the composition will be influenced by a number of factors, including the nature of the anionic polymer dispersion and the intended use of the coating composition.

Examples of suitable pigments include metal oxides, such as titanium dioxide, zinc oxide, iron oxide, or combinations thereof. In certain embodiments, the composition includes a titanium dioxide pigment. Examples of commercially titanium dioxide pigments are KRONOS® 2101, KRONOS® 2310, available from Kronos WorldWide, Inc. (Cranbury, NJ), TI-PURE® R-900, available from DuPont (Wilmington, DE), or TIONA® AT1 commercially available from Millenium Inorganic Chemicals. Titanium dioxide is also available in concentrated dispersion form. An example of a titanium dioxide dispersion is KRONOS® 4311, also available from Kronos WorldWide, Inc.

Examples of suitable fillers include calcium carbonate, nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), clay, (hydrated aluminum silicate), kaolin (kaolinite, hydrated aluminum silicate), mica (hydrous aluminum potassium silicate), pyrophyllite (aluminum silicate hydroxide), perlite, baryte (barium sulfate), Wollastonite (calcium metasilicate), and combinations thereof. In certain embodiments, the composition comprises a calcium carbonate filler.

Examples of suitable dispersants are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable thickening agents include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Defoamers serve to minimize frothing during mixing and/or application of the coating composition. Suitable defoamers include silicone oil defoamers, such as polysiloxanes, polydimethylsiloxanes, polyether modified polysiloxanes, and combinations thereof. Exemplary silicone-based defoamers include BYK®-035, available from BYK USA Inc. (Wallingford, CT), the TEGO® series of defoamers, available from Evonik Industries (Hopewell, VA), and the DREWPLUS® series of defoamers, available from Ashland Inc. (Covington, KY).

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-1, 2-methyl-4-isothiazolin-3-1 (MIT), 5-chloro2-methyl and -4-isothiazolin-3-1 (CIT), 2-octyl-4-isothiazolin-3-1 (OTT), 4,5-dichloro-2-n-octyl-3-isothiazolone, as well as acceptable salts and combinations thereof. Suitable biocides also include mildewcides that inhibit the growth mildew or its spores in the coating. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-1, diiodomethyl p-tolyl sulfone, as well as acceptable salts and combinations thereof. In certain embodiments, the coating composition contains 1,2-benzisothiazolin-3-1 or a salt thereof. Biocides of this type include PROXEL® BD20, commercially available from Arch Chemicals, Inc (Atlanta, GA).

Exemplary co-solvents and plasticizers include ethylene glycol, propylene glycol, diethylene glycol, and combinations thereof.

The coating compositions described above can be provided as aqueous dispersions having a solids content of from 30-85% or from 30 or 40-75%.

Also provided are coatings formed from the coating compositions described herein, as well as methods of forming these coatings. Generally, coatings are formed by applying a coating composition described herein to a surface, and allowing the coating to dry to form a coating. The resultant dry coatings typically comprise, at minimum, an anionically colloidally stabilized polymer and a polyamine curing additive. The dry coatings can further comprise 1 or more additives (e.g., pigments and/or fillers) as described above.

Coating compositions can be applied to a surface by any suitable coating technique, including spraying, rolling, brushing, or spreading. Coating compositions can be applied in a single coat, or in multiple sequential coats (e.g., in 2 coats or in 3 coats) as required. The coating can be co-applied with a setting accelerator to decrease the setting time of the coating on a surface. Suitable setting accelerators include compounds, such as acids, which consume the volatile base and decrease coating setting time. For example, the setting accelerator can be a dilute acid, such as acetic acid or citric acid. Setting accelerators can be applied to a surface prior to coating application, applied simultaneously with the coating composition, or applied to the coating after it has been applied to a surface, but prior to drying a particular application. Generally, the coating composition is allowed to dry under ambient conditions. However, in certain embodiments, the coating composition can be dried, for example, by heating and/or by circulating air over the coating.

Coating thickness can vary depending upon the application of the coating. For example, the coating can have a dry thickness of at least 1 or 10 mils (e.g., at least 15 mils, at least 20 mils, at least 25 mils, at least 30 mils, or at least 40 mils) for elastomeric coatings, especially where the coating needs to bridge cracks in the substrate. In such elastomeric instances, the coating has a dry thickness of less than 100 mils (e.g., less than 90 mils, less than 80 mils, less than 75 mils, less than 60 mils, less than 50 mils, less than 40 mils, less than 35 mils, or less than 30 mils). In some elastomeric embodiments, the coating has a dry thickness of between 10 mils and 100 mils. In certain embodiments, the coating has a dry thickness of between 10 mils and 40 mils. For less elastomeric coatings, such as metal coatings, and where the Tg can be from 15 or 25 to 80° C., the coating thickness may tend to be thinner such as 1 to 10 or 1 to 5 mils dry thickness.

In some embodiments, the coating is applied to a road surface as a traffic paint. In these embodiments, the road surface can be, for example, asphalt or concrete. In some cases, when the coating is applied as a traffic paint, the coating contains a filler such as a reflective filler.

In certain embodiments, the coating is applied to a surface to reflect solar radiation. In these cases, the coating will generally contain 1 or more pigments that reflect solar energy, such as titanium dioxide. By reflecting the sun's heat, the coating can help to cool a surface. In the case of coatings applied to architectural surfaces such as roofs, the roof coating can help to reduce a building's interior temperatures and cooling costs.

In certain embodiments, the coating is an elastomeric roof coating. In certain embodiments, the coating will generally satisfy the requirements of ASTM D6083-05, entitled "Standard Specification for Liquid Applied Acrylic Coating Used in Roofing." In particular embodiments, the coating has a tensile strength of greater than 200 psi, and an elongation at break of greater than 100%, according to ASTM D-2370, after 1,000 hours of accelerated weathering.

Polyamine curing additives can also be incorporated as setting agents in other types of compositions which contain anionically colloidally stabilized polymers or copolymers. In particular, polyamine curing additives may be utilized to decrease the water or rain damage of other compositions where fast setting and/or rain resistance are desirable. For example, polyamine curing additives can be added to conventional adhesives (e.g., construction adhesives), grouts, caulks, sealants, and exterior insulating and finishing systems (EIFS) to provide more water and rain resistant products earlier in the setting or drying process.

Also provided are coatings formed from the coating compositions described herein, as well as methods of forming these coatings. Generally, coatings are formed by applying a coating composition described herein to a surface, and allowing the coating to dry to form a coating. The resultant dry coatings typically comprise, at minimum, an anionically colloidally stabilized polymer and a polyamine curing additive. The dry coatings can further comprise 1 or more additional polymers and/or additives as described above. The coating thickness can vary depending upon the application of the coating. In some embodiments, the coating has a dry thickness of between 1 or 10 mils and 100 mils. In certain elastomeric embodiments, the coating has a tensile strength of greater than 200 psi after a drying period of 14 days at room temperature, according to ASTM D-2370, and/or an elongation at break of greater than 100% after a drying period of 14 days at room temperature, according to ASTM D-2370. In some elastomeric embodiments, the coating has a tensile strength of greater than 200 psi, and an elongation at break of greater than 100%, according to ASTM D-2370, after 1,000 hours of accelerated weathering. In less elastomeric coatings, such as metal coatings, the coating can have higher tensile strength and lower elongation to break.

The coating compositions can be applied to a variety of surfaces including, but not limited to metal, asphalt, concrete, stone, ceramic, wood, plastic, polymer, polyurethane foam, glass, and combinations thereof. The coating compositions can be applied to interior or exterior surfaces. In certain embodiments, the surface is an architectural surface, such as a roof, wall, floor, or combination thereof.

EXAMPLES

Ingredients:
DMAPMA—dimethylaminopropyl methacrylamide
HEMA—2-hydroxyethyl methacrylate
Initiator A—1.37 g of 70% TBHP in 4.8 g of water
TBHP—t-butyl hydrogen peroxide
Reductant A—0.96 grams of erythorbic acid in 24 grams of water
Iron(II) sulfate heptahydrate
Na4-ETDA—tetrasodium ethylenediaminetetraacetc acid
AMPS™ 2045—2-acrylamido-2methylpropanesulfonic acid or its sodium or ammonia salt (AMPS)
SLS—sodium lauryl sulfate
Bisomer™ MPEG 350MA—350 molecular weight capped polyethylene oxide esterified with methacrylic acid. Available from Geo.
Methacrylamide
Sipomer™ PAM-100—phosphate ester of polyethylene glycol methacrylate available from Solvay or Rhodia
MMA—methyl methacrylate
2-EHA—2-ethylhexylacrylate
VCN acrylonitrile
MAA—methacrylic acid
Silane A-171—Vinyltrimethoxysilane
COPS—sodium 1-allyloxy-2-hydroxypropane sulfonate available from Solvay Styrene
AA—acrylic acid
AE-960 is an acrylic polymer from Lubrizol Advanced Materials, Inc. having anionic colloidal stabilizing group. One could use similar polymers such as Dow Rhoplex™ ED-1791, Rhoplex™ 2885 or BASF Acrynol™ NS 567 and get similar results for viscosity and similar performance as a coating.

Comparative Example I with HEMA

Monomer composition=80 DMAPMA/20 HEMA. An aqueous polymer was prepared as follows. A monomer premix was made by mixing 120 grams of water, 96 grams of dimethylaminopropyl methacrylamide (DMAPMA) and 24 grams of 2-hydroxyl ethyl acrylate (HEMA). Initiator A was made by mixing 1.37 grams of 70% t-butyl hydrogen peroxide (TBHP) in 4.8 grams of water. Reductant A was prepared by dissolving 0.96 grams of erythorbic acid in 24 grams of water. A one-liter reactor was charged with 336 grams of water, 1.68 grams of 0.15% Iron(II) sulfate heptahydrate and 0.48 grams of 1% tetrasodium ethylenediaminetetraacetic acid (Na4-ETDA), and then was heated to 60° C. under a nitrogen blanket with proper agitation. At 60° C., Initiator A was added to the reactor. After about 2 minutes, the monomer premix was proportioned to the reaction vessel for over a period of 120 minutes, and reductant A was proportioned to the reactor for over a period of 150 minutes. After completion of reductant A feed, the temperature of the reaction vessel was maintained at 60° C. for 60 minutes. The reactor was then cooled to 50° C. A solution of 0.43 grams of 70% TBHP and 0.04 grams of 30% sodium lauryl sulfate (SLS) in 6 grams of water was added to the reactor. After 5 minutes, a solution of 0.25 grams of erythorbic acid in 6 grams of water was added to the reactor. The reactor was maintained at 50° C. After 30 minutes, a solution of 0.43 grams of 70% TBHP and 0.04 grams of 30% sodium lauryl sulfate (SLS) in 6 grams of water was added to the reactor. After 5 minutes, a solution of 0.25 grams of erythorbic acid in 6 grams of water was added to the reactor. The reactor was maintained at 50° C. for about 30 minutes. Then, the reactor was cooled to the room temperature. The polymer had a pH 9.5, solids 16.4%, viscosity 15 cps.

Comparative Example II with AMPS 2045

Monomer composition=80 DMAPMA/20 AMPS 2045. A polymer was prepared same as Comparative Example 1 except 48 grams of 50% AMPS 2405 (From Lubrizol) was used instead of HEMA. The polymer had a pH 10.9, solids 17.6%, viscosity 29 cps.

Comparative Example III with Methacrylamide

Monomer composition=80 DMAPMA/20 Methacrylamide. A polymer was prepared same as Comparative Example 1 except 24 grams of methacrylamide was used instead of HEMA. The polymer had a pH 9.9, solids 17.8%, viscosity 24 cps.

Invention Examples of Polyamine Additives

Example 1 with MPEG 350MA

Monomer composition=80 DMAPMA/20 MPEG350 MA. A polymer was prepared same as Comparative Example 1 except 24 grams of Bisomer MPEG 350MA (from GEO) was used instead of HEMA. The polymer had a pH 10.3, solids 17.3%, viscosity 31 cps.

Example 2 with MPEG 350MA

Monomer composition=70 DMAPMA/30 MPEG350 MA. A polymer was prepared same as Comparative Example 1 except a monomer mix contained 84 grams of DMAPMA and 36 grams of Bisomer MPEG 350MA. The polymer had a pH10.4, solids 18.0%, viscosity 11 cps.

SLS in 9 grams of water was added to the reactor. After 5 minutes, a solution of 0.38 grams of erythorbic acid in 9 grams of water was added to the reactor. The reactor was maintained at 50° C. for about 30 minutes. Then, the reactor was cooled to the room temperature and filtered through 100-micron cloth. The polymer had a pH10.1, solids 22.4%, and viscosity 560 cps.

Example 4 with MPEG 350MA and PAM-100

Monomer composition=70 DMAPMA/20 MPEG350 MA/10 PAM-100. A polymer was prepared same as Example 3, except a monomer mix contained 180 grams of water, 18 grams of Sipomer PAM-100 (from Solvay), 8.4 grams of 28% ammonium hydroxide, 126 grams of DMAPMA and 36 grams of Bisomer MPEG 350MA. The polymer had a pH10.1, solids 23.6%, and viscosity 1104 cps.

Example 5 with MPEG 350MA and Methacrylamide

Monomer composition=70 DMAPMA/10 MPEG350 MA/20 methacrylamide. An emulsion polymer was prepared as follows. A monomer premix was made by mixing 160 grams of water, 32 grams of methacrylamide, 112 grams of dimethylaminopropyl methacrylamide (DMAPMA) and 16 grams of Bisomer MPEG 350MA. Initiator A was made by

TABLE I

Polyamine Additives

| Polyamine | DMAPMA | HEMA | MPEG 350MA | AMPS-2405 | TS, % | pH | Visc |
|---|---|---|---|---|---|---|---|
| Comp. # I | 80 | 20 | 0 | 0 | 16.4 | 9.5 | 15 |
| Ex. # 1 | 80 | 0 | 20 | 0 | 17.3 | 10.3 | 31 |
| Comp. # II | 80 | 0 | 0 | 20 | 17.6 | 10.9 | 29 |
| Ex. # 2 | 70 | 0 | 30 | 0 | 18 | 10.4 | 11 |

Example 3 with MPEG 1005 MA and VA-086

Monomer composition=70 DMAPMA/30 MPEG1005 MA. An emulsion polymer was prepared as follows. A monomer premix was made by mixing 153 grams of water, 126 grams of dimethylaminopropyl methacrylamide (DMAPMA) and 108 grams of Visiomer MEG 1005MA W (50% in water, Evonik). Initiator A was made by dissolving 0.9 grams of 2,2'-Azobis[2-methyl-N-(2-hydroxyethyl)propionamide] (Azo VA-086 from Wako) in 14.4 grams of water. Initiator B was prepared by dissolving 0.27 grams of Azo VA-086 in 36 grams of water. A one-liter reactor was charged with 324 grams of water, and then was heated to 85° C. under a nitrogen blanket with proper agitation. At 85° C., Initiator A was added to the reactor, and then monomer premix was proportioned into the reaction vessel for over a period of 75 minutes. About 1 minute after the start of monomer premix proportioning, Initiator B was proportioned to the reactor for over a period of 120 minutes. The reaction temperature was kept at 85° C. After completion of Initiator B feed, the temperature of the reaction vessel was maintained at 85° C. for 60 minutes. The reactor was then cooled to 50° C. A solution of 0.64 grams of 70% TBHP and 0.06 grams of 30% SLS in 9 grams of water was added to the reactor. After 5 minutes, a solution of 0.38 grams of erythorbic acid in 9 grams of water was added to the reactor. The reactor was maintained at 50° C. After 30 minutes, a solution of 0.64 grams of 70% TBHP and 0.06 grams of 30% dissolving 0.8 grams of 2,2'-Azobis[2-methyl-N-(2-hydroxyethyl)propionamide] (Azo VA-086 from Wako) in 20.5 grams of water. Initiator B was prepared by dissolving 0.24 grams of Azo VA-086 in 32 grams of water. A one-liter reactor was charged with 280 grams of water, and then was heated to 85° C. under a nitrogen blanket with proper agitation. At 85° C., Initiator A was added to the reactor, and then monomer premix was proportioned into the reaction vessel for over a period of 75 minutes. About 1 minute after the start of monomer premix proportioning, Initiator B was proportioned to the reactor for over a period of 120 minutes. The reaction temperature was kept at 85° C. After completion of Initiator B feed, the temperature of the reaction vessel was maintained at 85° C. for 60 minutes. The reactor was then cooled to 50° C. A solution of 0.57 grams of 70% TBHP and 0.05 grams of 30% SLS in 8 grams of water was added to the reactor. After 5 minutes, a solution of 0.34 grams of erythorbic acid in 8 grams of water was added to the reactor. The reactor was maintained at 50° C. After 30 minutes, a solution of 0.57 grams of 70% TBHP and 0.05 grams of 30% SLS in 8 grams of water was added to the reactor. After 5 minutes, a solution of 0.34 grams of erythorbic acid in 8 grams of water was added to the reactor. The reactor was maintained at 50° C. for about 30 minutes. Then, the reactor was cooled to the room temperature and filtered through 100-micron cloth. The polymer had a pH10.3, solids 22.34%, and viscosity 370 cps.

Example 6 with MPEG 350MA and AMPS-2411

Monomer composition=70 DMAPMA/25 MPEG350 MA/5 AMPS-2411. A polymer was prepared same as Example 5 except a monomer mix contained 160 grams of water, 16 grams of AMPS-2411 (50% in water from Lubrizol), 112 grams of DMAPMA, and 40 grams of Bisomer MPEG 350MA. The polymer had a pH10.0, solids 22.94.0%, viscosity 26 cps.

Example 7 with MPEG 1005 MA

Monomer composition=85 DMAEMA/15 MPEG1005 MA. A polymer was prepared same as Example 3, except a monomer mix contained 180 grams of water, 153 grams of dimethyl aminoethyl methacrylate (DMAEMA) and 54 grams of Visiomer MEG 1005MA W. The polymer had a pH 9.1, solids 16.8%, and viscosity 990 cps.

Example 8 with MPEG 350MA and MMA

Monomer composition=70 DMAEMA/20 MPEG350 MA/10MMA. A polymer was prepared same as Example 3, except a monomer mix contained 180 grams of water, 126 grams of DMAEMA, 18 grams of methyl methacrylate (MMA), and 36 grams of Bisomer MPEG 350MA. The polymer had a pH 9.2, solids 18.1%, viscosity 8000 cps.

Example 9 with MPEG 350MA and DMAEMA

Monomer composition=50 DMAEMA/50 MPEG 350 MA. A polymer was prepared same as Example 3, except a monomer mix contained 180 grams of water, 90 grams of DMAEMA, and 90 grams of Bisomer MPEG 350MA. The polymer had a pH 9.2, solids 19.5%, viscosity 1650 cps.

Example 10 with MPEG 750MA and DMAEMA

Monomer composition=80 DMAEMA/20 MPEG 350 MA. A polymer was prepared same as Example 3, except a monomer mix contained 128 grams of water, 128 grams of DMAEMA, and 64 grams of Visiomer MPEG 750MA-W (50% in water, Evonik). The polymer had a pH 9.4, solids 19.03%, viscosity 576 cps.

Example 11 with MPEG 350MA and DMAEMA

Monomer composition=75 DMAEMA/15 MPEG 350 MA/10 n-VP. A polymer was prepared same as Example 3, except a monomer mix contained 180 grams of water, 135 grams of DMAEMA, 27 grams of Bisomer MPEG 350MA, and 18 grams of n-vinyl pyrrolidinone. The polymer had a pH 9.3, solids 16.6%, viscosity 1280 cps.

Example 12 with MPEG 350MA

Monomer composition=50 DMAPMA/50 MPEG350 MA. A polymer was prepared same as Comparative Example 1 except 60 grams of Bisomer MPEG 350MA and 60 grams of DMAPMA. The polymer had a pH 10.3, solids 16.2% viscosity 10 cps.

Example 13 with MPEG 350MA

Monomer composition=30 DMAPMA/70 MPEG350 MA. A polymer was prepared same as Comparative Example 1 except 84 grams of Bisomer MPEG 350MA and 36 grams of DMAPMA. The polymer had a pH 10.0, solids 18.4%, viscosity 40 cps.

Synthesis of Polymers

Polymers A, B, C, D, E and F were made the same procedure as described in the Example #8 of U.S. Pat. No. 7,931,972 with the monomer compositions as shown in the Table II.

TABLE II

| | | | | | Polymers | | | | | |
|---|---|---|---|---|---|---|---|---|---|---|
| Polymer | 2EHA | MMA | BA | VCN | MAA | Sipomer COPS-1 | AA | NaSS | pH | TS, % |
| A | 76.7 | 10 | 0 | 10 | 2 | 0 | 0 | 0 | 9.3 | 55.4 |
| B | 76.7 | 10.7 | 0 | 10 | 1.3 | 0 | 0 | 0 | 9.3 | 55.5 |
| C | 76.7 | 10.7 | 0 | 10 | 0.65 | 0.65 | 0 | 0 | 9.3 | 54.8 |
| D | 76.7 | 10.7 | 0 | 10 | 0 | 0 | 1.3 | 0 | 9.3 | 55.2 |
| E | 0 | 3 | 83.7 | 10 | 3 | 0 | 0 | 0 | 8.1 | 55.4 |
| F | 0 | 3 | 83.2 | 10 | 3 | 0 | 0 | 0.5 | 8.1 | 55.4 |

Stability of Polyamine Additives in Polymers

In the stability investigation, polyamine was diluted with 2 times DI water, and then 1 wt. % of polyamine was added to polymer on solid to solid basis under proper agitation. Then, they are aged on 50° C. oven for 4 weeks. The results are summarized in Table III.

TABLE III

| Polyamine Stability in Polymer | | |
|---|---|---|
| Polyamine | Polymer | 4-week 50° C. Oven Stability |
| Comp. Ex. I | A | Viscosity increase |
| | B | Viscosity increase |
| | C | Gelled up |
| | D | Viscosity increase |
| Comp. Ex. II | A | Gelled up |
| | B | Viscosity increase |
| | C | Gelled up |
| | D | Okay |
| Ex. 1 | A | Okay |
| | B | Okay |
| | C | Viscosity increase |
| | D | Okay |

Both Polymer E and Polymer F were pH adjusted with ammonia to PH 10 and mixed with polyamine additives on solid to solid basis. Polyamines were mixed with equal amounts of DI water before adding to each polymer. The polymer and polyamine mixtures were put in over 60° C. for stability investigation. The results are listed in the Table IV and V.

TABLE IV

Viscosity Changes of Polymer E with Various Polyamines
Polymer E Viscosity Results at 60° C. (Visc = KU)

| Polyamine | 0.4 wt % (24 hrs) 60° C. | 0.4 wt % (48 hrs) 60° C. | 0.4 wt % (4 wks) 60° C. | 0.7 wt % (24 hrs) 60° C. | 0.7 wt % (48 hrs) 60° C. | 0.7 wt % (4 wks) oven |
|---|---|---|---|---|---|---|
| Ex. 1 | 58.1 | 54.2 | 60.4 | 73.1 | 55.3 | 60.4 |
| Ex. 2 | 55.3 | 57.8 | 65.7 | 55 | 87.3 | 123.6 |
| Ex. 12 | 57 | 92.7 | >141 | 57.6 | 82.8 | 124.5 |
| Ex. 13 | 57.3 | 64.7 | 72.2 | 59.9 | 63.3 | 65.7 |
| Comp. Ex. I | Gelled | Gelled | Gelled | Gelled | Gelled | Gelled |
| Comp. Ex. II | Gelled | Gelled | Gelled | Gelled | Gelled | Gelled |
| Comp. Ex. III | Gelled | Gelled | Gelled | Gelled | Gelled | Gelled |

TABLE V

Viscosity Changes of Polymer F with Various Polyamines
Polymer F Viscosity Results at 60° C. (Visc = KU)

| Polyamine | 0.4 wt % (24 hrs) | 0.4 wt % (48 hrs) | 0.4 wt % (4 wks) | 0.7 wt % (24 hrs) | 0.7 wt % (48 hrs) | 0.7 wt % (4 wks) |
|---|---|---|---|---|---|---|
| Ex. 2 | 55.9 | 55.6 | 61.9 | 55.3 | 54.5 | 58.6 |
| Ex. 12 | 57 | 56.2 | 63.6 | 55.3 | 55.3 | 57 |
| Ex. 13 | 64 | 63.3 | 66.8 | 64.3 | 62.1 | 64.3 |
| Comp. Ex. I | 76.4 | 81.8 | >141 | 86.6 | 105.9 | Gelled |
| Comp. Ex. II | 63.6 | 62.4 | 101.8 | >141 | Gelled | Gelled |
| Comp. Ex. III | >141 | Gelled | Gelled | Gelled | Gelled | Gelled |

Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by" is inclusive or open-ended and does not exclude additional, un-recited elements or method steps. However, in each recitation of "comprising" herein, it is intended that the term also encompass, as alternative embodiments, the phrases "consisting essentially of" and "consisting of" where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A water dilutable polyamine additive comprising the polymerization product of free radically polymerizable monomers into repeating units of a polyamine wherein:
   a) from 30-90 wt. % of repeating units are from a free radically polymerizable tertiary amine monomer(s) comprising Formula $A_1$ or $A_2$

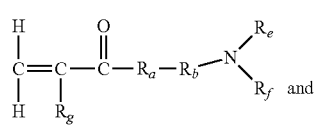

Formula $A_1$

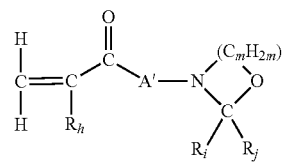

Formula $A_2$ wherein $R_a$ is O or $NR_k$, $R_b$ is a $C_1$ to $C_6$ alkylene, $R_e$ is a $C_1$-$C_4$ alkyl, $R_f$ is a $C_1$-$C_4$ alkyl, $R_g$ is H or methyl or ethyl and $R_h$ is H or methyl or ethyl, $R_k$ is H, a $C_1$-$C_4$ alkyl, or a $C_1$-$C_4$ acyl group, A' is poly(oxy-$C_2H_4$ and/or $C_3H_6$ alkylene) homopolymer or copolymer having a number average molecular weight of 88-348 g/mole, m is 2 or 3, $R_i$ is selected from a group consisting of hydrogen, phenyl group, benzyl group, and a $C_1$-$C_{12}$ alkyl group if it is not linked directly to $R_j$ to form an alkylene group, $R_j$ is selected from a group consisting of hydrogen, a $C_1$-$C_4$ alkyl group, if it is not linked directly to $R_i$, and optionally Ri and $R_j$ together are covalently bonded to each other to form a $C_4$ or $C_5$ alkylene group forming a 5 or 6 membered ring with the C atom to which they are attached, with b) from 10-60 wt. % of repeating units are from a poly(alkylene oxide) monomer B of the formula

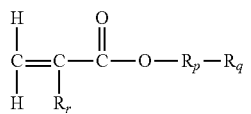

B wherein $R_p$ is a poly(alkylene oxide) having a number average molecular weight from about 88 to about 1200, wherein said poly(alkylene oxide) has 2 or 3 or 4 carbons per alkylene group, $R_q$ is H or $C_1$-$C_8$ alkylene group; and $R_r$ is H or methyl or ethyl;

c) from about 5 to about 60 wt. % of repeating units are from other free radically polymerizable monomers other than monomers $A_1$, $A_2$ and B, and the polyamine additive has a number average molecular weight from 10,000 and 500,000 Daltons based on GPC molecular weight determinations using polystyrene standards.

2. The water dilutable polyamide additive of claim 1, wherein the repeating units from the tertiary amine monomer selected from the group consisting of $A_1$ and $A_2$ are present in the polyamine from about 55 to 85 wt. %, the repeating units from polymerizable alkylene oxide monomer B is present from about 15 to 45 wt. %, and the repeating units from the other free radically polymerizable monomer(s) are present from 5 to 30 wt. % based on the total weight of the water dilutable polyamide additive.

3. The water dilutable polyamide additive of claim 1, wherein the repeating units from the tertiary amine monomer comprising Formula $A_1$ or $A_2$ are present in the polyamine from about 60 to 80 wt. %, the repeating units from polymerizable alkylene oxide monomer B are present from 20 to 40 wt. %, and the repeating units from the other free radically polymerizable monomer(s) are present from 5 to 15 wt. % based on the total weight of the water dilutable polyamine additive.

4. The water dilutable polyamine additive of claim 1, wherein the repeating units from the other free radically polymerizable monomer(s) are present at 5-10 wt. % based on the total weight of the water dilutable polyamine additive.

5. The water dilutable polyamine additive of claim 1, wherein the repeating units from free radically polymerizable tertiary amine monomer are at least 80 wt. % repeating units derived from polymerizing formula $A_1$ based on the combined weight of repeating units derived from $A_1$ and $A_2$.

6. The water dilutable polyamine additive of claim 1, wherein at least 90 mole % of $R_e$ and $R_f$ are methyl or ethyl.

7. The water dilutable polyamine additive of claim 1, wherein at least 80 mole % of the $R_a$ group are $NR_k$.

8. The water dilutable polyamine additive of claim 1, wherein at least 80 mole % of the $R_a$ groups are O.

* * * * *